US010885267B1

(12) United States Patent
Meislin

(10) Patent No.: US 10,885,267 B1
(45) Date of Patent: Jan. 5, 2021

(54) INTERACTIVE ELECTRONIC BOOK SYSTEM AND METHOD THEREFOR

(71) Applicant: Robert Meislin, New York, NY (US)

(72) Inventor: Robert Meislin, New York, NY (US)

( * ) Notice: Subject to any disclaimer, the term of this patent is extended or adjusted under 35 U.S.C. 154(b) by 0 days.

(21) Appl. No.: 16/993,019

(22) Filed: Aug. 13, 2020

Related U.S. Application Data

(60) Provisional application No. 62/889,425, filed on Aug. 20, 2019.

(51) Int. Cl.
*G06F 3/0482* (2013.01)
*G06F 40/169* (2020.01)
*G06F 40/109* (2020.01)
*G06F 3/0484* (2013.01)

(52) U.S. Cl.
CPC .......... *G06F 40/169* (2020.01); *G06F 3/0482* (2013.01); *G06F 3/04842* (2013.01); *G06F 40/109* (2020.01)

(58) Field of Classification Search
CPC ... G06F 40/109; G06F 3/0482; G06F 3/04842
See application file for complete search history.

(56) References Cited

U.S. PATENT DOCUMENTS

| | | | | |
|---|---|---|---|---|
| 2008/0295021 A1* | 11/2008 | Nguyen | ............... | G06F 16/9577 715/781 |
| 2011/0161183 A1* | 6/2011 | Farkas | ................... | G06Q 30/02 705/14.73 |
| 2011/0261030 A1* | 10/2011 | Bullock | ............... | G06F 3/04842 345/204 |
| 2013/0015954 A1* | 1/2013 | Thorne | ............... | G06F 3/04883 340/8.1 |
| 2013/0211944 A1* | 8/2013 | Momin | .................. | G06Q 30/06 705/26.2 |
| 2014/0013251 A1* | 1/2014 | Zafar | ..................... | G06F 3/0483 715/760 |
| 2015/0046782 A1* | 2/2015 | O'Donoghue | ........ | G06F 40/134 715/205 |
| 2015/0193427 A1* | 7/2015 | Puppin | .................... | H04L 67/10 704/10 |
| 2015/0293632 A1* | 10/2015 | Bullock | ............... | G06F 3/0488 345/174 |
| 2018/0032610 A1* | 2/2018 | Cameron | ............. | G06F 40/284 |
| 2019/0155949 A1* | 5/2019 | Castaneda | ........... | G06F 16/9038 |

* cited by examiner

Primary Examiner — Anil K Bhargava
(74) Attorney, Agent, or Firm — Weiss & Moy, P.C.; Jeffrey D. Moy

(57) ABSTRACT

A computing device displaying an electronic book (eBook) has a processor. A display is coupled to the processor. A user interface is coupled to the processor for entering data into the computing device. A memory is coupled to the processor. The memory stores program instructions that when executed by the processor, causes the processor to show text of the electronic book on the display, wherein predefined terms of the text have associated hyperlinks. A synopsis bubble is displayed adjacent a selected predefined term when the selected predefined term is accessed. The synopsis bubble displays at least one related hyperlink associated with the selected predefined term. Content from a selected hyperlink of the at least one hyperlink displayed in the synopsis bubble is downloaded and displayed.

18 Claims, 5 Drawing Sheets

INTERACTIVE ELECTRONIC BOOK SYSTEM AND METHOD THEREFOR

RELATED APPLICATIONS

The present patent application is related to related to U.S. Provisional Application Ser. No. 62/889,425, filed Aug. 20, 2019, in the name of the same inventor, and entitled, "INTERACTIVE ELECTRONIC BOOK SYSTEM AND METHOD THEREFOR", the present patent application claims the benefit under 35 U.S.C. § 119(e).

TECHNICAL FIELD

The present application generally relates to electronic books and, more particularly, to an electronic book and system wherein certain terms would have hyperlinks, selecting the hyperlink would download data allowing the user to have a more interactive experience when reading the electronic book and/or audio books.

BACKGROUND

In recent years, electronic books, as well as audio books (hereinafter electronic books), have grown in popularity. With the advent of portable electronic devices, more and more people are turning to electronic books as their preferred method of reading literature. However, electronic books, as well as printed books, suffer from a major problem.

Unlike television and movies, which allow a user to have a more interactive feeling by allowing users to have visual and auditory perception of a scene or item, electronic books, as well as printed books, do not have this ability. While, electronic books, as well as printed books, may display printed text and occasionally a still photo/illustration, they are not designed to provide further interactive capability.

Therefore, it would be desirable to provide a system and method that overcome the above problems. The system and method would provide an electronic book with interactive capabilities. The system and method would provide an electronic book wherein certain terms within the electronic book would have hyperlinks, selecting the hyperlink would download data allowing the user to have a more interactive experience when reading the electronic book.

SUMMARY

In accordance with one embodiment, a computing device displaying an electronic book (eBook) is disclosed. The computing device displaying the eBook has a processor. A display is coupled to the processor. A user interface is coupled to the processor for entering data into the computing device. A memory is coupled to the processor. The memory stores program instructions that when executed by the processor, causes the processor to: show text of the eBook on the display, wherein predefined terms of the text have associated hyperlinks; display a synopsis bubble adjacent a selected predefined term when the selected predefined term is accessed, the synopsis bubble displaying at least one related hyperlink associated with the selected predefined term; and download and displaying content from a selected hyperlink of the at least one hyperlink displayed in the synopsis bubble.

In accordance with one embodiment, a computing device displaying an electronic book (eBook) is disclosed. The computing device displaying an eBook has a processor. A display is coupled to the processor. A user interface is coupled to the processor for entering data into the computing device. A memory is coupled to the processor. The memory stores program instructions that when executed by the processor, causes the processor to: show text of the eBook on the display; accent predefined terms of the text to indicate that the predefined terms have associated hyperlinks, wherein the accent is one of bold print, italicized print, underline print, highlighted print or combinations thereof; display a synopsis bubble adjacent a selected predefined term when the selected predefined term is accessed, the synopsis bubble displaying at least one related hyperlink associated with the selected predefined term; and download and display content from a selected hyperlink of the at least one hyperlink displayed in the synopsis bubble.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary electronic book system provide an interactive experience for the user. Users of the electronic book system may be able to download, listen/see, and purchase items described within an electronic book. This may provide the user with a better sensory perception of what is being described in the electronic book as well as allow the user to purchase the item being described.

Figure 1:
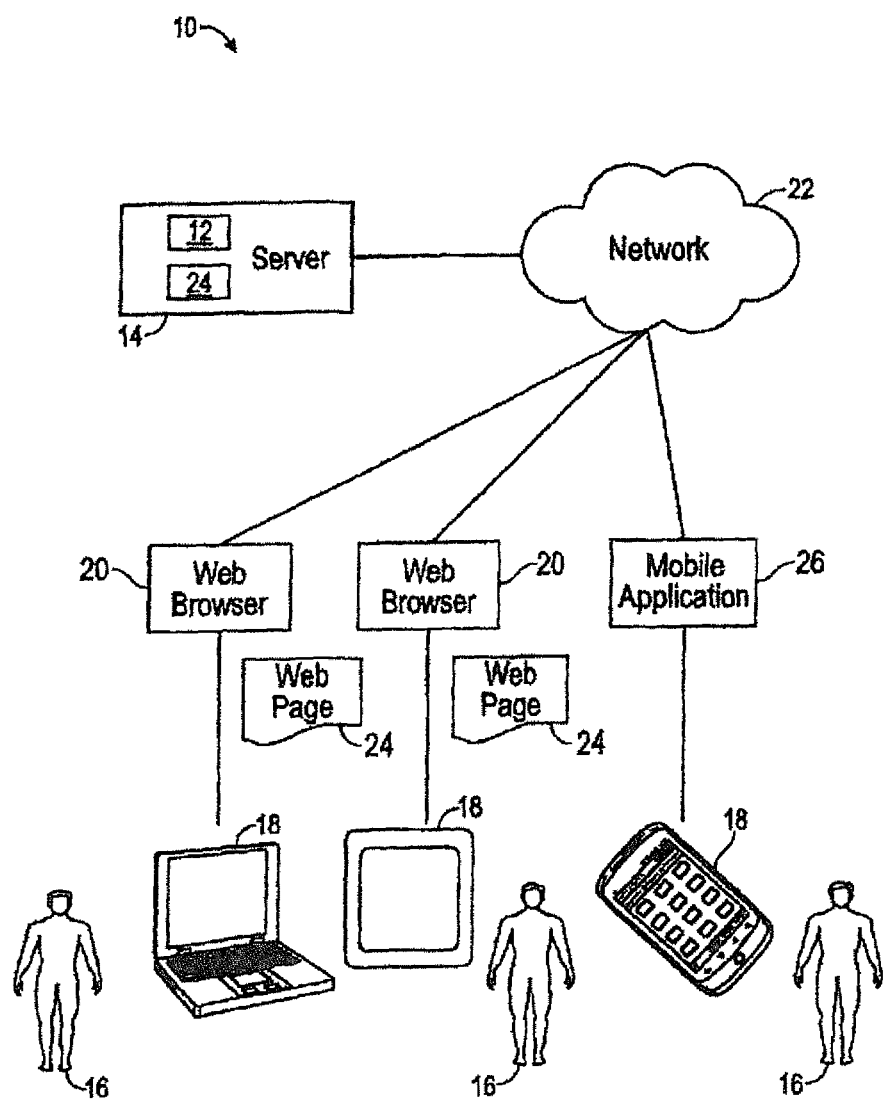
FIG. 1 is a block diagram of an exemplary interactive electronic book system in accordance with one embodiment of the present invention.

Referring now to FIG. 1, an electronic book system 10 may be shown. The electronic book system 10 may provide an electronic book platform 12 that may allow for a reader to have an interactive experience when reading an electronic book. The electronic book system 10 may have a server 14. The server 14 may be used to host the electronic book platform 12 of the present invention. Individuals 16 may use one or more computing devices 18 to access the electronic book platform 12 that may be hosted on the server 14. The computing devices 18 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. The computing device 18 may be described in the general context of computer system executable instructions, such as program modules, being executed by a computer system as may be described below.

The computing device 18 may be loaded with an operating system. The operating system of the computing device 18 may manage hardware and software resources of the computing device 18 and provide common services for computer programs running on the computing device 18. The computing device 18 may be loaded with a web browser 20. The web browser 20 may allow the computing device 18 to gain online access to a network 22 such as the World Wide Web. The web browser 20 may be Microsoft® Internet Explorer, Google® Chrome, Mozilla® Firefox, Apple® Safari or similar browsing applications. By connecting to the network 22, the computing device 18 may access a website 24 associated with the electronic book platform 12 hosted on the server 14.

Alternatively, or in addition to, the computing device 18 may download a mobile application 26. The mobile application 26 may access and communicate with the electronic book platform 12 hosted on the server 14. By connecting to the network 22, the computing device 18 may access and communicate with the electronic book platform 12 hosted on the server 14 via the mobile application 26.

Figure 2:
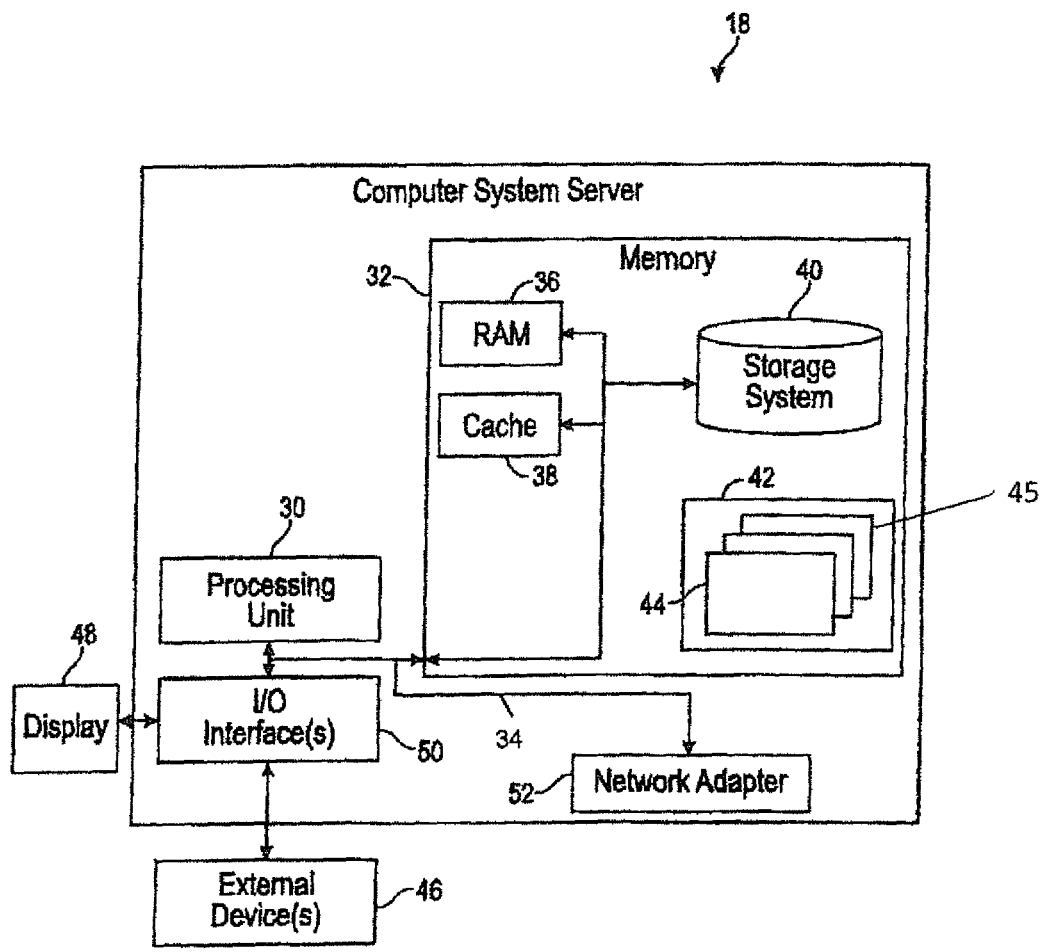
FIG. 2 is a block diagram of an exemplary computing device used in the interactive electronic book system of FIG. 1 in accordance with one embodiment of the present invention.

Referring now to FIG. 2, the computing devices 18 may be described in more detail in terms of the machine elements that provide functionality to the systems and methods disclosed herein. The components of the computing devices 18 may include, but are not limited to, one or more processors or processing units 30, a system memory 32, and a system bus 34 that couple various system components including the system memory 32 to the processor 30. The computing devices 18 may typically include a variety of computer system readable media. Such media could be chosen from any available media that is accessible by the computing devices 18, including non-transitory, volatile and non-volatile media, removable and non-removable media. The system memory 32 could include one or more computer system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, the program modules 44 may carry out the steps for initiating an event creation, private and group communication between invitees to the event created, visual and/or textual summaries of past events of individuals and other functionality as will be described below.

The computing device 18 may communicate with one or more external devices 46 such as a keyboard, a pointing device, a display 48, and/or any similar devices (e.g., network card, modem, etc.) that enable the computing device 18 to communicate with the server 14 (FIG. 1). In accordance with one embodiment, the display 48 may be a touchscreen to allow communication with the server. Such communication may occur via Input/Output (I/O) interfaces 50. Alternatively, the computing devices 18 may communicate with one or more networks such as a local area network (LAN), a general wide area network (WAN), and/or a public network (e.g., the network 24 shown in FIG. 1) via a network adapter 52. As depicted, the network adapter 52 may communicate with the other components of the computing device 18 via the bus 36.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring to the FIGs., one embodiment of operation of the electronic book platform 12 may be described. As may be seen in FIG. 3, a computing device 18 may be seen. The computing device 18 may be an electronic book reader, tablet, or other computing device previously mentioned. The computing device 18 may have the mobile application 26 preloaded. Alternatively, the mobile application 26 may be downloaded from iTunes®, Google Play®, Apotide® or other similar mobile application download sites. The computing device 18 may also access the webpage 24 in order to view/read an electronic book. The mobile application 26 and webpage 24 may allow the individual 16 to read the electronic books having an interactive capability.

Figure 3:
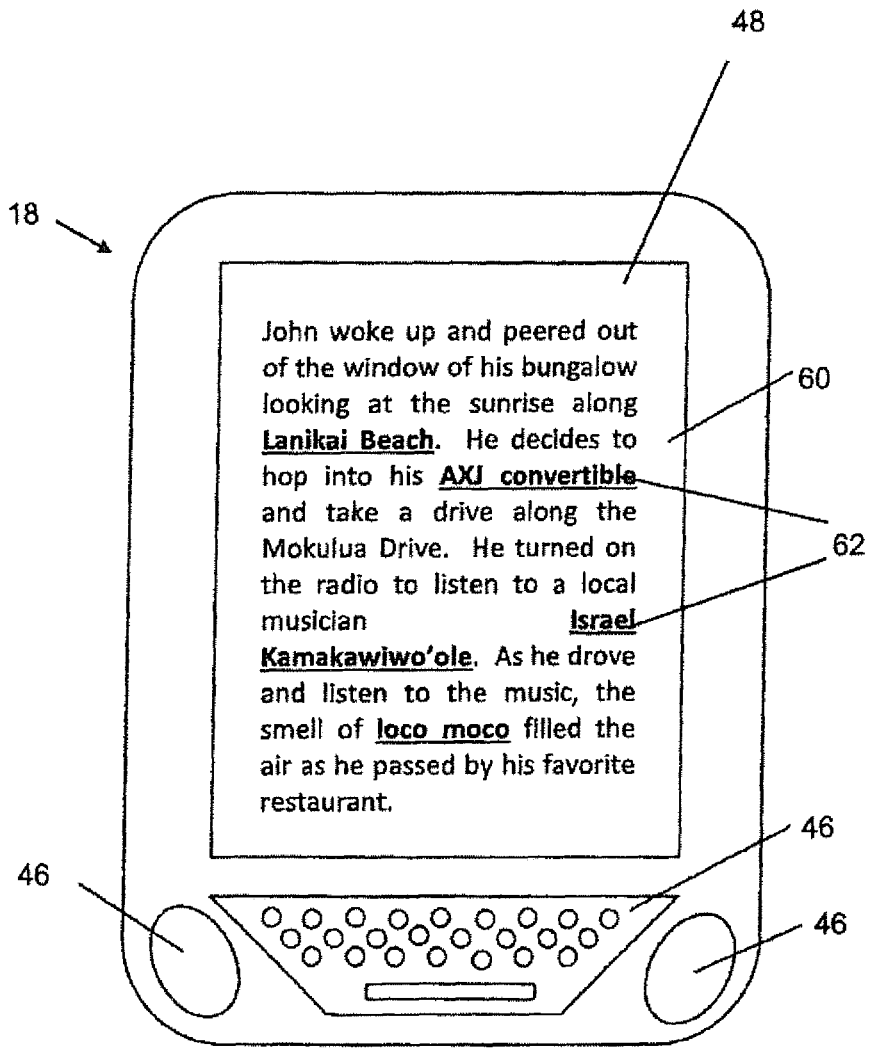
FIG. 3 is a front view of an exemplary computing device using the interactive electronic book system in accordance with one embodiment of the present invention.

Once the individual 16 accesses the webpage 24 or opens the mobile application 26, the individual 16 may open an electronic book on the computing device 18 as shown in FIG. 3. The electronic book may also be preloaded on the computing device 18. Alternatively, the computing device 18 may access the webpage 24 or other websites to view and select/download the electronic book.

Once an electronic book has been opened, the text 60 of the electronic book may be shown on the display 48 of the computing device 18. The individual 16 may turn the pages of the electronic book by using one or more external devices 46. As may be seen in FIG. 3, predefined terms 62 of the text 60 may have hyperlinks 64 associated therewith. These predefined terms 62 may be accented so that the individual 18 may know that these terms are predefined terms 62. The predefined terms 62 may be accented by having these terms in bold print, underlined, italicized, highlighted, combinations thereof, or similar markings. In the present embodiment shown, the predefined terms 62 may be in bold and underlined. However, this is shown only as an example and should not be seen in a limiting manner.

For an audio book, the predefined terms 62 may have a tone associated therewith. For example, for each predefined term 62, a buzz, a ring, a ding, a bell or other tone may be played after the predefined term 62 is spoken. The above is given as examples and should not be seen in a limiting manner.

When an individual 16 comes across a predefined term 62 when reading the text 60 of the electronic book, the individual 16 may view a synopsis of the predefined term 62 by using one or more external devices 46 to move a cursor to the predefined term 62, touching the predefined term 62 on the display 48 if the display 48 is a touch screen display, or by similar means. As may be seen in FIG. 4, once the individual 16 moves a cursor to the predefined term 62 or touches the predefined term 62 on the display 48, a synopsis bubble 66 may be shown. The synopsis bubble 66 may show a hyperlink 64 associated with the predefined term 62. The hyperlink 64 is the location/web address where data may be downloaded. The synopsis bubble 66 may show other information other than or including the hyperlink 64. The synopsis bubble 66 may show a brief description of what may be downloaded and shown, a picture of what may be downloaded, or other information related to what may be downloaded.

Figure 4:
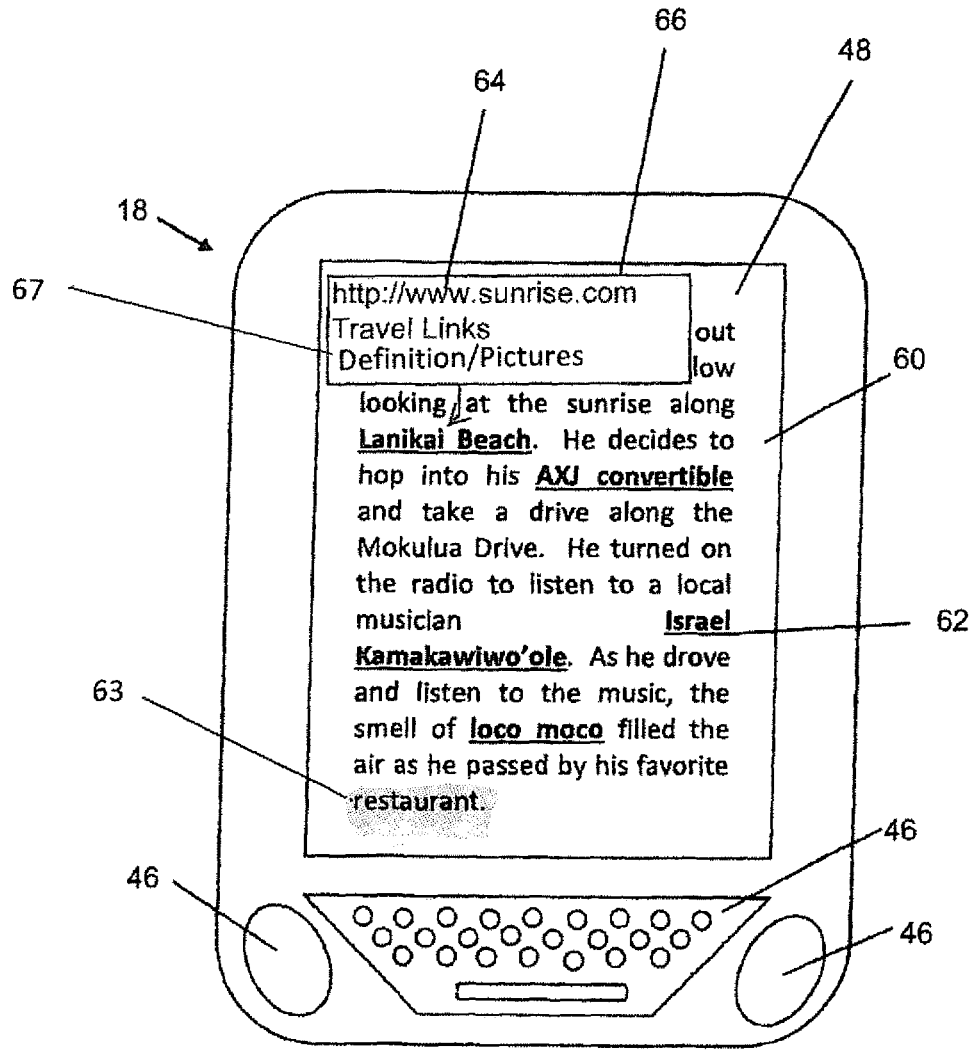
FIG. 4 is a front view of an exemplary computing device using the interactive electronic book system in accordance with one embodiment of the present invention.

As may be seen in FIG. 4, the text Lanikai Beach may be a predefined term 62. When the individual 16 moves a cursor to Lanikai Beach, touches the term Lanikai Beach on the display 48 if the display 48 is a touch screen display, or takes similar actions, the synopsis bubble 66 may appear. The synopsis bubble 66 may show the hyperlink 64 where the data may be downloaded if the individual 18 clicks on the predefined term 62 for Lanikai Beach, a picture showing what may be downloaded, a listing showing additional links for reserving/traveling to Lanikai Beach, purchasing a travel guide or other book about Lanikai Beach, and the like.

Figure 5:
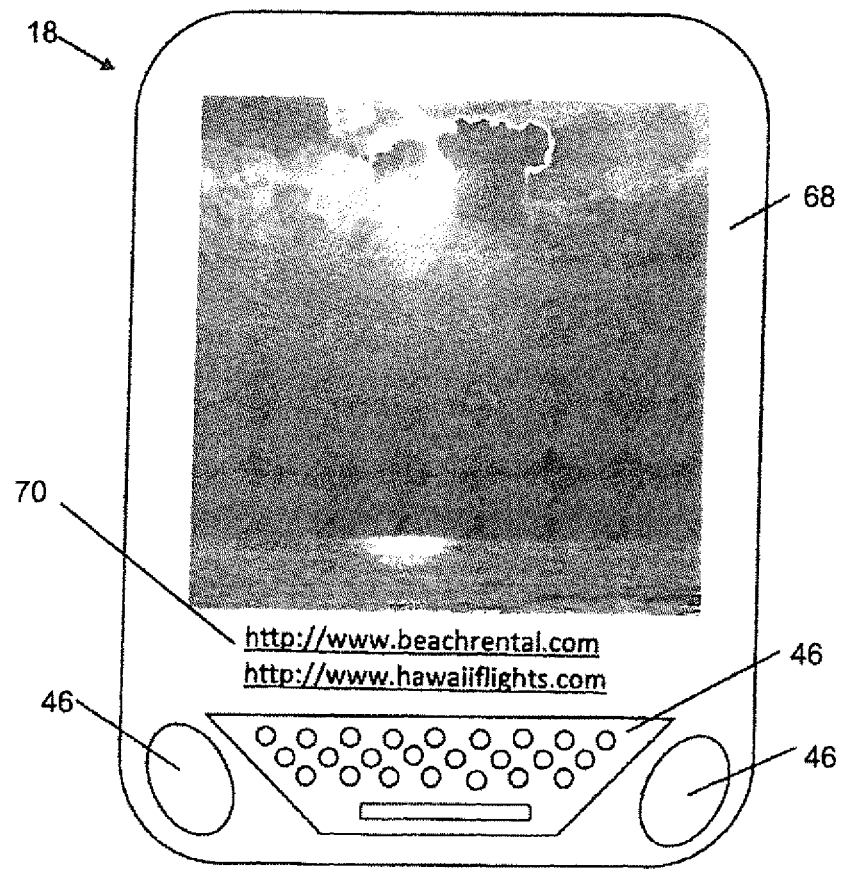
FIG. 5 is a front view of an exemplary computing device using the interactive electronic book system in accordance with one embodiment of the present invention.

The individual 16 may click on the predefined term 62 using one or more external devices 46 to move a cursor to the predefined term 62 and entering, touching the predefined term 62 on the display 48 if the display 48 is a touch screen display, or by similar means. Selecting the predefined term 62 causes the hyperlink 64 of the predefined term 62 to download data. The downloaded data may change the display 48 on the computing device 18. As may be seen in FIG. 5, the individual 16 may select and enter the hyperlink 64 associated with the predefined term 62 for Lanikai Beach. The hyperlink 64 may download data and change the display 48 to show a sunrise picture 68. The sunrise picture 68 may be a still picture, a video with or without sound, a live feed, or the like. This may allow the individual 16 to have a more interactive experience when reading the electronic book.

For an audio book, the individual 16 may use a voice controlled personal assistant feature associated with the webpage 24 or the mobile application 26. The individual 16 may press an Input/Output (I/O) button associated with one or more external devices 46 to activate the voice controlled personal assistant feature. Pressing the voice controlled personal assistant feature a may provide a vocal synopsis of the predefined term 62. Pressing the voice controlled personal assistant feature and saying the predefined term 62 may select and enter the hyperlink 64 associated with the predefined term 62. The hyperlink 64 may download data associated with the predefined term 62.

The select hyperlink 64 associated with the predefined term 62 may display additional information. For example, in the present embodiment, additional hyperlinks 70 may be displayed. These hyperlinks 70 may take the individual 16 to a website that provide services related to the predefined term 62. For example, the hyperlinks 70 may take the individual 16 to a website to book hotel accommodations near Lanikai Beach, a website to book flights to Hawaii, a website to purchase a travel book or other type of book associated with Lanikai Beach, and the like. The above is given as examples and should not be seen in a limiting manner.

Hyperlinks to other websites and services may be provided without departing from the spirit and scope of the present invention. For example, for the predefined term 62 AXJ convertible, selecting the hyperlink 64 associated with this predefined term 62 may download a website for a rental car agency to rent this particular vehicle, a car dealership to review/purchase this vehicle, download a picture of this vehicle and the like. For the predefined term 62 Israel Kamakawiwo'ole, selecting the hyperlink 64 related to this predefined term 62 may download and play a song associated with Israel Kamakawiwo'ole, display a website for downloading/playing a song associated with Israel Kamakawiwo'ole such as Spotify®, Pandora®, Apple Music and the like, display a website with a biography of Israel Kamakawiwo'ole, and the like. For the predefined term 62 loco moco, selecting the hyperlink 64 related to this predefined term 62 may display a picture of a loco moco, display a website for food delivery for ordering loco moco or other food items such as Grubhub®, DoorDash® and the like, display a website for restaurant reviews such as Yelp®, and the like.

In accordance with one embodiment, the computing device 18 may have a tracking unit 45. The tracking unit 45 may be used to monitor the location of the computing device 18. By using the location information, different hyperlinks 70 may be displayed. In the example above, for the predefined term 62 AXJ convertible, the hyperlink 64 associated with this predefined term 62 may download a website for a rental car agency closest to the location of the computing device 18. Similarly, for the predefined term 62 loco moco, the hyperlink 64 displayed may be related to restaurants serving loco moco closest to the location of the computing device 18.

In accordance with one embodiment, the electronic book platform 12 may allow the individual 16 to search up words in the text 60 that may not have a hyperlink 64. The individual 16 may use a search button located on the external device 46. When the search button is activated, the individual 16 may highlight 63 a word the individual 16 may want to search-up. To highlight 63 a word, the individual 16 may move a cursor to highlight the word, touch the word on the display 48 if the display 48 is a touch screen display, or highlight a word by similar means. As may be shown in FIG. 4, the word restaurant has been highlighted.

Once a word has been highlighted, the electronic book may use a word recognition feature to identify the highlighted word. Once the word has been identified, a synopsis bubble 66 may appear. The synopsis bubble 66 may show the hyperlink 64 associated with the highlight 63 word. The hyperlink 64 is the location/web address where data may be downloaded. The synopsis bubble 66 may show other information other than or including the hyperlink 64. The synopsis bubble 66 may show a brief description of what may be downloaded and shown, a picture of what may be downloaded, or other information related to what may be downloaded.

In accordance with one embodiment, the synopsis bubble 66 may show a menu of options. For example, the synopsis bubble 66 may list different options 67 that the individual 16 may choose. The options 67 may be, but not limited to: definition of the highlight 63 word, pictures associated with the highlight 63 word, general search of the highlight 63 word, and the like. The individual 16 may then select one of the options 67 shown in the synopsis bubble 66. The individual 16 may move a cursor to a desired option 67, touch the option 67 on the display 48 if the display 48 is a touch screen display, or select the option 67 by similar means. Once one of the options 67 is selected, one or more hyperlinks 64 associated with the selected option 67 may be displayed in the synopsis bubble 66.

The purpose of providing the hyperlinks 64 for the predefined terms 62 is to provide the individual 16 with a more interactive experience when reading the electronic book. The hyperlinks 64 may allow the individual 16 to see/hear/experience what the character in the electronic book is experiencing. Websites and companies may want to use the electronic book system 10 as a way to get additional business at a rate less than traditional ways of advertising.

The foregoing description is illustrative of particular embodiments of the application, but is not meant to be a limitation upon the practice thereof. The following claims, including all equivalents thereof, are intended to define the scope of the application.

What is claimed is:

1. A computing device displaying an electronic book (eBook) comprising:
   a processor;
   a display coupled to the processor;
   a user interface coupled to the processor for entering data into the computing device; and
   a memory coupled to the processor, the memory storing program instructions that when executed by the processor, causes the processor to:
   show text of the eBook on the display, wherein predefined terms of the text have associated hyperlinks;
   display a synopsis bubble adjacent a selected predefined term when the selected predefined term is accessed, the synopsis bubble displaying at least one related hyperlink associated with the selected predefined term and a summary describing contents to be downloaded of the at least one related hyperlink associated with the selected predefined term; and
   download and display content from a selected hyperlink of the at least one hyperlink displayed in the synopsis bubble.

2. The computing device of claim 1, wherein the memory storing program instructions that when executed by the processor, causes the processor to accent the predefined term of the text to indicate that the predefined terms have the associated hyperlinks.

3. The computing device of claim 1, wherein the memory storing program instructions that when executed by the processor, causes the processor to accent the predefined term of the text to indicate that the predefined terms have the associated hyperlinks, the accent being one of bold print, italicized print, underline print, highlighted print or combinations thereof.

4. The computing device of claim 1, wherein the memory storing program instructions that when executed by the processor, causes the processor to display the synopsis bubble when one of a cursor on the display is moved to the selected predefined term or when pressure is applied on the display where the selected predefined term is shown.

5. The computing device of claim 1, wherein the memory storing program instructions that when executed by the processor, causes the processor to download and display a definition of the selected predefined term.

6. The computing device of claim 1, wherein the memory storing program instructions that when executed by the processor, causes the processor to download, display and play a song associated with the selected predefined term.

7. The computing device of claim 1, wherein the memory storing program instructions that when executed by the processor, causes the processor to download and display a website to one of rent or purchase an item associated with the selected predefined term.

8. The computing device of claim 1, wherein the memory storing program instructions that when executed by the processor, causes the processor to determine a location of the computing device.

9. The computing device of claim 1, wherein the memory storing program instructions that when executed by the processor, causes the processor to:
   determine a location of the computing device;
   download and display content from the selected hyperlink of the at least one hyperlink displayed in the synopsis bubble, wherein the website to one of rent or purchase the item associated with the selected predefined term is based on the location of the computing device.

10. The computing device of claim 1, wherein the memory storing program instructions that when executed by the processor, causes the processor to:
    select a word in the text of the eBook that is not one of the predefined terms;
    perform word recognition on the selected word; and
    display the synopsis bubble adjacent the selected word, the synopsis bubble displaying at least one related hyperlink associated with the selected word.

11. The computing device of claim 10, wherein the memory storing program instructions that when executed by the processor, causes the processor to display the synopsis bubble adjacent the selected word, the synopsis bubble displaying a menu.

12. A computing device displaying an electronic book (eBook) comprising:
    a processor;
    a display coupled to the processor;
    a user interface coupled to the processor for entering data into the computing device; and
    a memory coupled to the processor, the memory storing program instructions that when executed by the processor, causes the processor to:
    show text of the eBook on the display;
    accent predefined terms of the text to indicate that the predefined terms have associated hyperlinks, wherein the accent is one of bold print, italicized print, underline print, highlighted print or combinations thereof;
    display a synopsis bubble adjacent a selected predefined term when the selected predefined term is accessed, the synopsis bubble displaying at least one related hyperlink associated with the selected predefined term and a summary describing contents to be downloaded of the at least one related hyperlink associated with the selected predefined term; and download and display content from a selected hyperlink of the at least one hyperlink displayed in the synopsis bubble.

13. The computing device of claim 12, wherein the memory storing program instructions that when executed by the processor, causes the processor to display the synopsis bubble when one of a cursor on the display is moved to the selected predefined term or when pressure is applied on the display where the selected predefined term is shown.

14. The computing device of claim 12, wherein the memory storing program instructions that when executed by the processor, causes the processor to download, display and play a song associated with the selected predefined term.

15. The computing device of claim 12, wherein the memory storing program instructions that when executed by the processor, causes the processor to download and display a website to one of rent or purchase an item associated with the selected predefined term.

16. The computing device of claim 12, wherein the memory storing program instructions that when executed by the processor, causes the processor to:
   determine a location of the computing device;
   download and display content from the selected hyperlink of the at least one hyperlink displayed in the synopsis bubble, wherein the website to one of rent or purchase an item associated with the selected predefined term is based on the location of the computing device.

17. The computing device of claim 12, wherein the memory storing program instructions that when executed by the processor, causes the processor to:
   select a word in the text of the eBook that is not one of the predefined terms;
   perform word recognition on the selected word; and
   display the synopsis bubble adjacent the selected word, the synopsis bubble displaying at least one related hyperlink associated with the selected word.

18. The computing device of claim 12, wherein the memory storing program instructions that when executed by the processor, causes the processor to:
   perform word recognition on the selected word; and
   display the synopsis bubble adjacent the selected word, the synopsis bubble displaying a menu to selected what will be displayed.

\* \* \* \* \*